United States Patent
Reece et al.

(10) Patent No.: US 6,184,473 B1
(45) Date of Patent: Feb. 6, 2001

(54) ELECTRICAL CABLE HAVING A SELF-SEALING AGENT AND METHOD FOR PREVENTING WATER FROM CONTACTING THE CONDUCTOR

(75) Inventors: David Reece; Jonathan Waller, both of Carrollton; Nick Ware, Villa Rica; Philip Sasse, Douglasville, all of GA (US)

(73) Assignee: Southwire Company, Carrollton, GA (US)

( * ) Notice: Under 35 U.S.C. 154(b), the term of this patent shall be extended for 0 days.

(21) Appl. No.: 09/228,482

(22) Filed: Jan. 11, 1999

(51) Int. Cl.⁷ ........................................... H01B 7/00
(52) U.S. Cl. .................. 174/110 R; 174/113 R; 174/116
(58) Field of Search ................ 174/116, 110 R, 174/113 R, 36, 115

(56) References Cited

U.S. PATENT DOCUMENTS

| | | | |
|---|---|---|---|
| 3,775,548 | * 11/1973 | Zinser, Jr. et al. | 174/23 |
| 3,823,255 | * 7/1974 | La Gase et al. | 174/113 R |
| 3,843,568 | * 10/1974 | Woodland et al. | 260/2.5 B |
| 4,095,404 | * 6/1978 | Babayan | 57/164 |
| 4,631,229 | * 12/1986 | Martens et al. | 428/343 |
| 4,703,132 | * 10/1987 | Marciano-Agostinelli | 174/23 C |
| 5,010,209 | * 4/1991 | Marciano-Agostinelli | 174/23 |
| 5,049,593 | * 9/1991 | Marciano-Agostinelli | 523/173 |
| 5,221,781 | * 6/1993 | Aida et al. | 524/433 |
| 5,455,881 | * 10/1995 | Bosisio et al. | 385/100 |
| 5,898,044 | * 4/1999 | Nooren | 428/323 |

* cited by examiner

Primary Examiner—Kristine Kincaid
Assistant Examiner—William H Mayo, III
(74) Attorney, Agent, or Firm—Herbert H. Hanegan; J. Rodgers Lunsford III

(57) ABSTRACT

An electrical cable with a stranded central conductor encircled by insulation including a material which provides self-sealing properties to the cable present at least between the adjacent edges of the stranded conductor and the insulation. Preferably, the material is a polymeric material which is flowable at a temperature at least as low as 25° C. and has a 100 gram needle penetration value greater than 100 tenths of a millimeter at 25° C.

18 Claims, 1 Drawing Sheet

ELECTRICAL CABLE HAVING A SELF-SEALING AGENT AND METHOD FOR PREVENTING WATER FROM CONTACTING THE CONDUCTOR

BACKGROUND OF THE INVENTION

Insulated solid and stranded electrical cables are well known in the art. Generally stranded cables include a central stranded conductor with a protecting insulation jacket disposed around the conductor.

The most frequent cause of failure of directly buried aluminum secondary cables is a cut or puncture in the insulation inflicted during or after installation. This leads to alternating current corrosion of the aluminum and finally to an open circuit. When a conductor is exposed to wet soil, upon damage, leakage current may flow, and cause localized electrochemical conversion of aluminum to hydrated aluminum oxide and eventually to an open circuit of the conductor.

In the U.S., thousands of such instances occur annually and the repair (location, excavation, repair, and replacement) can be very costly. As a result of the failures and in response to this problem, a tougher insulation system was introduced and became an industry standard. The tougher cable is described as "ruggedized," and generally consists of two layers: an inner layer of high molecular weight polyethylene and an outer layer of high density polyethylene. This design is more resistant to mechanical damage than one pass crosslinked polyethylene, but still can result in exposure of the aluminum conductor if sufficient impact is involved.

Investigations show that AC electrolysis current can approach half-wave rectification when the current density is high. This accounts for the rapid loss of aluminum metal frequently experienced in the field. A caustic solution (pH 10–12) develops at the aluminum surface and dissolves the protective oxide film.

The mechanism of aluminum cable failure is the formation of hydrous aluminum oxide. As the aluminum oxide solids build up, the insulation in the vicinity of the puncture is forced to swell and splits open, making larger areas of the aluminum conductor surface available for electrolysis, thus increasing the leakage current and accelerating the corrosion process. Rapid loss of aluminum by AC electrolysis continues until ultimately the cable is open-circuited. A caustic environment is created at the aluminum, electrolyte interface, which dissolves the protective oxide film.

The ruggedized or abuse resistant type insulation was supposed to protect the cable from physical abuse. While it helped this problem, it did not eliminate 600 V cable failures. Utilities have recently reported varying numbers of 600 V aluminum underground distribution cable failure rates scattered between 70 and 7000 per year. Failures are evidenced by an open circuit condition accompanied by severe corrosion of the aluminum conductor.

All the reasons for 600 V failures are unknown, but several have been postulated by cable users. These cables seem to experience a high degree of infant mortality, followed by failures occurring over decades. The infant mortalities are usually directly related to damage caused by adjacent utilities, damage inflicted by landscaping and planting, or damage to the cable prior to or during installation. The failures occurring years later are harder to explain. There have been postulations of lightning damage, manufacturing defects, or insulation degradation over the life of the installation.

In order to better understand the insulation characteristics, studies of the AC breakdown, and DC impulse breakdown were conducted. AC breakdown studies on several different cables showed a high safety margin of performance. Each of these cables had a 0.080 inch wall thickness. Tests were conducted in water filled conduits. The AC breakdown strength of all of these cables was consistently above 20 kV, far in excess of the operating stress.

Impulse breakdown studies have also been performed on several 600 V cable constructions having different insulation formulations. The impulse breakdown level of these cables was approximately 150 kV. This exceeds the BIL requirements of a 15 kV cable system and should well exceed the impulses on 600 V secondary cables during operation.

The above margins of electrical performance were measured on new cables. They are far above what is needed to operate on a 600 V system since most of these cables operate at 120 V to ground. One of the tests during compound and product development is a long term insulation resistance test performed in water at the rated operating temperature of the insulation. For crosslinked polyethylene cables the water temperature is 90° C. The insulation resistance must demonstrate stability and be above minimum values for a minimum of twelve weeks. If there is instability indicated, the test is continued indefinitely. Relative permittivity is measured at 80 v/mil and must meet specific values. Increase in capacitance and dissipation factor are also measured in 90° C. water over a 14 day period. Insulation compounds used in present day cables easily meet these requirements.

Manufacturing defects in cable insulation are found during production by either of two methods. During the extrusion process, the cable is sent through a spark tester, where 28 kV DC, or 17 kV AC, is applied to the insulation surface. Any manufacturing defect resulting in a hole in the insulation will initiate a discharge, which is detected by the spark tester. Most manufacturers use this method. Another test that is also often employed is a full reel water immersion test. In this test 21 kV DC, or 7 kV AC is applied to the cable after immersion for 1 hour or 6 hours, depending on whether the cable is a plexed assembly or single conductor, respectively. The actual voltages used for these tests are dependent on the wall thickness. The above values are for an 0.080 inch wall.

The above testing has demonstrated electrical performance that is stable and far surpasses the requirements of the installation for 600 V cable. This does not explain a sudden cable failure after many years of operation. Such sudden failure can be explained by a better understanding of the failure mechanism. Aluminum corrosion in the presence of an alternating leakage current is a combination of two different mechanisms. Aluminum is normally afforded a great deal of corrosion protection by a relatively thin barrier layer of aluminum oxide, and a more permeable bulk layer of oxide. However, flaws or cracks exist in these layers which provides a spot for the corrosion reaction to begin. The metal in contact with water undergoes an anodic (positive ions moving into solution) and a cathodic cycle, sixty times per second.

During the anodic halfcycle of leakage current, aluminum ions leave the metallic surface through these flaws and combine with hydroxyl ions in the water surrounding the cable. This reaction results in pitting of the metal and the formation of aluminum hydroxide, the whitish powder evident in corroded cables. Another important reaction also occurs. The hydroxyl ions are attracted to the metal surface during this half cycle, which increases the pH, causing a caustic deterioration of the oxide layer, further exposing more aluminum.

During the cathodic half cycle another reaction occurs. Hydrogen ions are driven to the aluminum surface. Instead of neutralizing the caustic hydroxyl concentration, the hydrogen ions combine and form hydrogen gas, which leaves the cable. The hydrogen depletion has the effect of further concentrating the caustic hydroxyl ions, thus furthering the deterioration of the surface oxide. No pitting occurs during this half cycle since the aluminum ion is attracted to the metal. A caustic solution develops, hydrogen evolves, aluminum pitting takes place, and aluminum hydroxide forms during this reaction.

A critical current density is necessary to sustain the corrosion reaction. Below this current density corrosion will be very slight, or almost imperceptible. Once the current density is high enough, the reaction can be swift. The necessary current density is below $1 mA/in^2$. The current density of a damaged 600 V cable is influenced by the voltage, leakage resistance, and the area of exposed metal. Variables affecting this can include dampness of the soil, chemistry of the soil, degree of damage, etc.

The toughest cables on the market today will not always stand up to the rigors of handling, installation, and operation. And exposed aluminum will eventually deteriorate. The solution, then, is to find a way to economically prevent the corrosion process.

Attempts have been made to prevent the ingress of moisture by introducing a sealant between the strands of the conductor and between the conductor and the insulation. See U.S. Pat. Nos. 3,943,271 and 4,130,450. However, it has been found that the mere introduction of a sealant into such spaces is not entirely satisfactory. Attempts to prevent moisture from reaching the conductor, such as using water swellable material, have not met with technical and/or economic success. For example, voids may be formed in the sealant during the application thereof or may be formed if the cable is accidentally punctured. Any such spaces or voids form locations for the ingress of moisture which can lead to corrosion of the conductor and conventional sealants used in the cables cannot eliminate such voids.

A prior art attempt to minimize the flow of moisture or water within the interstitial spaces of a stranded conductor came in the form of compacted or compressed stranded conductors. The stranded conductor itself was radially crushed in order to reduce the diameter of the conductor and to fill the interstitial spacing with metal from the individual wires themselves. The drawback to this method is that even though some deformation of the individual wires does take place, and some of the interstitial spacing is filled, there is still the possibility of cable insulation damage through which moisture can enter the cable and contact the conductor.

Another attempt at correcting moisture flowing within interstitial space consisted of filling the interstitial space with a foreign substance which physically prevented the flow of the moisture or water within the conductor structure. These substances typically comprised some type of jelly base and a polyethylene filler material. At slightly elevated temperatures, this compound becomes fluid and viscous and can be applied as the conductor is being formed. The individual wires used to form the conductor are fed into an extrusion die where the moisture blocking compound is extruded onto and around each individual wire and, as the wires are stranded into the conductor, the interstitial space is filled with the jelly-like material. Upon cooling, the filler becomes very stable and immobile and does not flow out of the interstitial spaces of the stranded conductor. Once the filling compound is applied within the interstitial spaces of the stranded conductor, it tends to remain in place. The problems encountered in applying such a filling substance revolve around precise metering of the material into the interstitial spaces as the stranded conductor is being formed. If too much material is extruded into the conductor, the outer insulation will not fit properly. If too little material is applied, the interstitial spaces will not be filled and therefore will allow moisture to flow within the conductor.

Another drawback to this method of applying a moisture blocking material is that an extrusion head and an extrusion pump for applying the material is required for every individual layer of wires used to form the conductor. The problems described above regarding the regulation of the volume of material applied through an extrusion head are multiplied every time an additional extrusion pump and extrusion head is required within the conductor manufacturing system. Prior art efforts to manufacture an acceptable moisture blocked conductor revolved around methods for uniform application of the moisture blocking material to the conductor, but did not solve the problems created by handling and installation damage.

Applications of moisture blocking material to the spacing of concentric lay conductors is known within the industry. This can be found in U.S. Pat. Nos. 3,607,487; 3,889,455; 4,105,485; 4,129,466; 4,435,613; 4,563,540; and 4,273,597.

U.S. Pat. No. 4,273,597 shows a method of strand filling the interstitial spacing of a conductor with a powder. This is accomplished by passing the strands through a fluidized powder bed, where the interstitial spacing is filled with the powder. The stranded conductor then exits the opposite end of the bed where an insulating layer is applied which prevents the powder from vacating the interstitial spacing of the conductor.

U.S. Pat. No. 4,563,540 describes a conductor which is constructed by flooding a waterproofing material among the individual conductors which make up the core of the stranded conductor. This flooded core is then wrapped with a plurality of different layers of shielding material which prevents the influx of moisture into the stranded conductor.

U.S. Pat. No. 4,435,613 describes a conductor constructed of a plurality of layers of insulating material with the core (or conducting portion) of the conductor being filled with an insulating layer of polyethylene. This polyethylene layer is contained by other rubber and plastic and epoxy compounds which produce a conductor having a waterproof construction.

U.S. Pat. No. 4,129,466 deals with a method for the application of the filling medium which is applied to a stranded conductor. This method comprises a chamber into which are passed individual wires that will be used to form the stranded conductor. These wires have a filling medium applied to them in the chamber. After the application of this filling medium, the conductor is passed through a chilling chamber where the filling medium is cooled and allowed to solidify within the interstitial spaces. This method requires that the chamber containing the filling medium and the stranded conductor be both heated and pressurized. The heat applied to the chamber reduces the viscosity of the filling material, while the pressure assures introduction of the material into the interstitial spaces of the stranded conductor.

U.S. Pat. No. 4,105,485 deals with the apparatus utilized in the '466 method patent previously discussed.

U.S. Pat. 3,889,455 discloses a method and apparatus for filling the interstitial spacing of the stranded conductor in a high temperature flooding tank. The individual wires are fed into a tank containing the filling material, the material having been heated to allow it to become less viscous. The individual wires are stranded and closed within the confines of the flooding tank and the finished conductor is withdrawn from the opposite end of the flooding tank where it is passed through a cooling means. The disadvantages experienced here involve the practice of stranding the conductor beneath the surface of an elevated temperature moisture block pool. No access, either visual or mechanical, to the conductor manufacturing process is practical.

U.S. Pat. No. 3,607,487 describes a method whereby individual strands of wire are fed into a flooding tank which is supplied with heated filling material by a pump and an injection means. The stranded conductor is withdrawn through the opposite end of the flooding tank, wiped in a wiping die, wrapped in a core wrapper and then passed through a binder where it is bound. The bound, wrapped core is then passed through a cooler which sets the filling material. The above described process is repeated through another flooding tank, another cooler, another binding machine, another flooding tank, another extruder, another cooling trough, and is eventually withdrawn from the end of the manufacturing line as a product having a plurality of layers of moisture blocking compound which protects the conductor core. The disadvantages here comprise a complex manufacturing line whereby moisture blocking material is applied at many different locations, each having to be meticulously monitored and controlled in order for a proper conductor construction to be obtained.

It can be readily seen from the above referenced methods and apparatuses that moisture blocked conductors are known and it can also be recognized that there are major problems concerning the elimination of moisture contacting the conductor as a result of handling and installation of a cable.

BRIEF SUMMARY OF THE INVENTION

The present invention relates to improvements in insulated solid and stranded cables.

In one embodiment of the invention, during manufacture of the self-sealing cable, a material which provides the cable with puncture, crack, and void self-sealing properties is included between the conductor and the insulation. An additional water barrier material may also be included between the insulator and the conductor. Preferably, both materials are included in the cable. In this way, not only are the voids filled by the material, but the material will flow into any void, puncture, or crack formed in the insulation, thus preventing migration of moisture, with the added safety of the additional water barrier. When an additional water barrier, such as a polymer sheet or film, is used, the self-sealing material is applied over such barrier between the barrier and the insulation, in which case the self-sealing material does not contact the conductor.

BRIEF DESCRIPTION OF THE DRAWINGS

The objects and advantages of the invention will be apparent from the following detailed description of the preferred embodiments thereof in conjunction with the accompanying drawings in which.

DETAILED DESCRIPTION IN THE INVENTION

Although the principles of the present invention are applicable to different types of electric cables, the invention will be described in connection with a known cable structure, such as a 600 volt cable, which normally comprises, as a minimum:

(1) A central conductor of stranded wires of a good conductivity metal such as copper, aluminum, copper alloys or aluminum alloys; and (2) A layer of insulation around the stranded conductors which has been extruded thereover.

Figure 1:
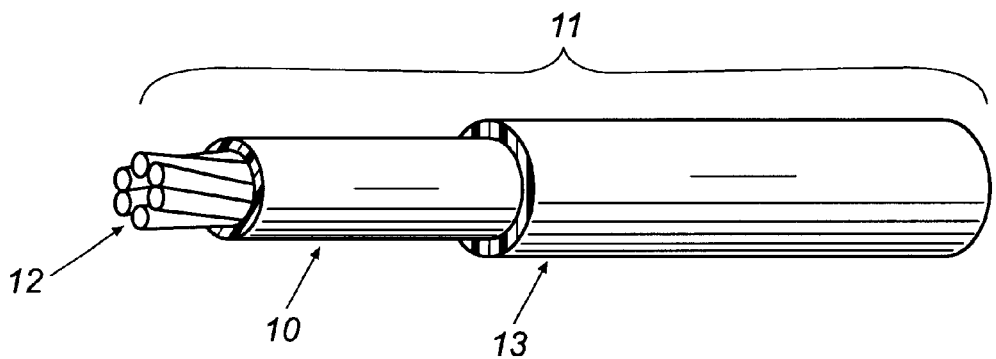
FIG. 1 is a cut-away, perspective view of a cable of the invention showing a stranded conductor, the insulation, and the material which provides the self-sealing effect.

FIG. 1 shows a cable 11 comprising a conductor 12 of stranded wires of copper or aluminum or alloys thereof. A layer 10 of material which provides the self-sealing effect encircles the conductor 12 and fills any spaces between conductor 12 and an insulation jacket 13 which encircles material 10 and conductor 12. Insulation jacket 13 is of known material and is preferably an extruded polymeric material.

Preferred material 10 comprises a polymer which can be readily pumped at temperatures at least as low as 25° C. Preferably, the polymer will be a low molecular weight polymer such as low molecular weight isomer. Other materials, or combinations of materials, with or without such polymers, having such characteristics may also be useful in the present invention. A polymer which has been found to be particularly suitable is polyisobutene.

The preferred polymer of the present invention has very little or no significant Shore A hardness. A test of determining whether or not the polymer has acceptable properties is the Penetrometer Test incorporated in ASTM D5 Penetration of Bituminous Materials. The 100 grams needle penetration value at 25° C. should be greater than about 100 tenths of a millimeter.

The material used to provide the self-sealing effect to the electric cable of the present invention has the following properties:

(a) The material is substantially insoluble in water;

(b) The material is a dielectric, i.e., it is non-conductive and is not a semi-conductor;

(c) The material causes the cable to be self-sealing, i.e., it will flow, at ambient temperature, into insulation voids and/or cracks and prevent contact between the conductor and moisture which could cause cable failure; and (d) The material does not absorb moisture or swell upon contact with moisture.

In the preferred embodiment of the present invention, the material used to fill the space between the conductor and the insulation is a compound of low molecular weight isomer or a low molecular weight copolymer of an isomer. Preferably, the material is polyisobutene. Advantageously there is little or no air present in the cable between the conductor and the insulation.

The material of the present invention may optionally contain filler material, but is essentially free of any solvents or oils.

The cable 11 described in connection with FIG. 1 can be used without further layers encircling the insulation jacket 13.

Also, in other embodiments of the present invention described herein, the conductor and layers of insulation can be the same as those described in connection with FIG. 1.

Figure 2:
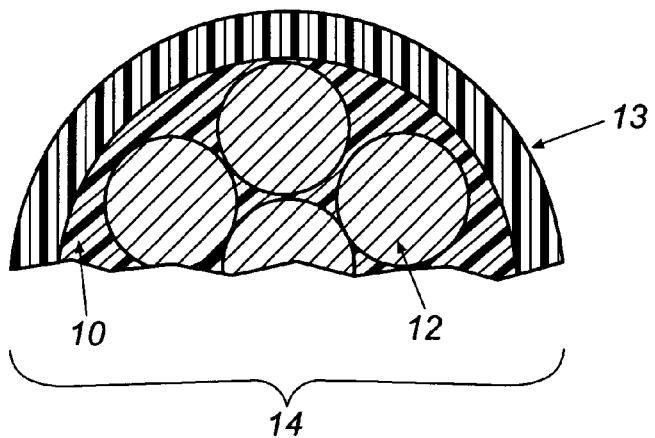
FIG. 2 is an end view of the embodiment of the cable shown in FIG. 1.

The cable 14 illustrated in FIG. 2 is an end view of cable 11 illustrated in FIG. 1.

Figure 3:
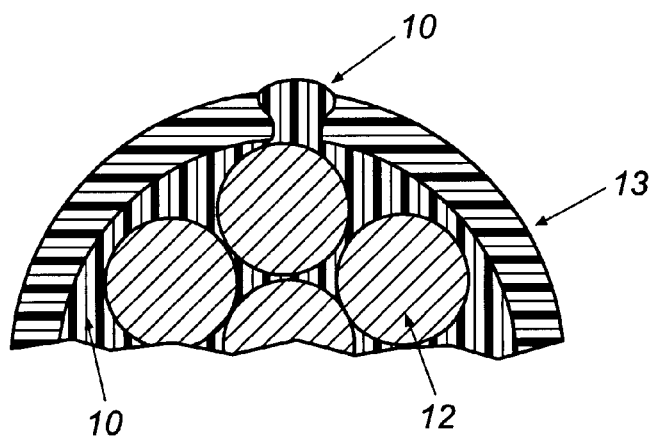
FIG. 3 is an end view of the cable shown in FIG. 2 having a break in the insulation with the break sealed by the material.

FIG. 3 is an end view of cable 11 shown in FIG. 1 and illustrates the self-sealing effect of material 10 which flows into a break in insulation jacket 13, thereby preventing moisture from coming into contact with conductor 12.

It is to be understood that in the embodiments described which include additional layers of protective material between the conductor and the insulation jacket, including an additional water barrier of a polymer sheet or film, it is not essential that the jacket tightly enclose the layers there within or enter into the spaces between the wires and protective materials, i.e., the interior size of the jacket can be essentially equal to the exterior size of the elongated elements so that compression of the elongated elements, and hence, indentation of the layers there within including the insulation, is prevented.

The cable of the present invention is of particular advantage in that not only does the material fill the space between the conductor and the insulation as the cable is manufactured, but after the cable is placed in service the material will flow into any cuts or punctures formed as a result of damage during handling and installation of the cable or its use in service. The stresses placed on the conductor and the insulation during handling and installation of the cable, such as bending, stretching, reeling and unreeling, striking with digging and installation equipment can form cuts or punctures in the insulation and between the insulation and the conductor. Such cuts or punctures can also be formed after the cable has been placed in service as a result of damage from adjacent utilities, homer owners, or lightening strikes. As can be seen from the Example, the cable of the present invention can provide acceptable service even after the insulation has been cut or punctured, exposing the conductor.

EXAMPLE 1

Defects which exposed the conductor were made in the insulation layer of two 600 V cable samples. On one of the cable samples, a layer of polyisobutene polymer had been applied to the surface of the conductor. The other cable sample did not have the polyisobutene layer. Both cable samples were placed inside separate 1 liter glass beakers containing tap water. Each cable sample was energized at 110 V to ground with AC current. The sample which did not have the polyisobutene layer exhibited severe corrosion overnight. The sample containing the polyisobutene layer exhibited no corrosion after being energized and submerged for 4 weeks in tap water in the glass beaker.

Although preferred embodiments of the present invention have been described and illustrated, it will be apparent to those skilled in the art that various modifications may be made without departing from the principles of the invention.

EXAMPLE 2

The conductors from seven 600 V cable samples approximately 12 inches in length were coated with the polyisobutylene. A defect was made in the middle of each sample which exposed the conductor. Three untreated cables (without polyisobutylene) were similarly damaged to expose the conductor. Each of the cable samples was then placed inside a laboratory rectangular soil box, across and through the long sides of the box, which was then filled with soil. Each sample was energized at 110 V to ground. The soil box was periodically watered to insure that the conditions leading to AC corrosion were present. Measurements of leakage current were taken to monitor the effect of the polyisobutylene layer on preventing corrosion. Periodically, the ability of each sample to carry 20 amps AC current was tested. Over a period of 2 months, all of the untreated cables showed increasing levels of current leakage, indicating progressive corrosion. The ability of the untreated samples to carry current deteriorated rapidly during this period. At the end of two months, untreated sample #1 was unable to carry more than 0.5 amps AC current. Untreated sample #2 could carry only 12.2 amps while untreated cable #3 could carry no more than 9.6 amps. Current leakage from the untreated samples increased steadily over the 2 month test span from a low of 0.32 mA up to a high of 353 mA. In contrast, none of the treated samples showed a current leakage greater than 47.6 mA. After the initial reading on this sample showing 47.6 mA, the polyisobutylene apparently sealed the defect as indicated by a drop in the current leakage to 0.37 mA at the end of the 2 month test period. The other treated samples showed similar results, however most never showed leakage current over 0.5 mA. In addition, all of the treated samples continued to carry 20 amps current at the end of the 2 month test period.

What is claimed is:

1. An electrical cable consisting essentially of a conductor, a layer of insulation around said conductor and a material flowable at about 25° C. between the conductor and the layer of insulation which provides self-sealing properties to the cable, wherein said material is a dielectric and has capacity, upon creation of discontinuity in the layer of insulation, of reestablishing continuity in the layer of insulation in a reversible manner, wherein said material is polyisobutene.

2. The electrical cable of claim 1 wherein said material has a 100 gram needle penetration value greater than 100 tenths of a millimeter at 25° C.

3. The electrical cable of claim 1 wherein the conductor is formed by a plurality of wires stranded together.

4. An electrical cable as set forth in claim 1 having empty spaces formed during or after a cable manufacturing process, but before installing the cable wherein the empty spaces formed prior to installation of the cable, during installation of the cable, and after the cable is placed in service, within said insulation layer and between said insulation layer and the conductor, contain the material which provides the cable with self-sealing properties.

5. A method of making an insulated electrical cable having empty spaces formed during or after a cable manufacturing process, but before installing the cable which mitigates the effects of voids, punctures, or cracks formed in an insulation prior to installation of the cable, during an installation of the cable, and after the cable is placed in service comprising the steps of:
   (a) forming a conductor
   (b) applying a layer of dielectric material flowable at about 25° C. which provides self-sealing properties on the exterior of the conductor, wherein the material is polyisobutene; and
   (c) forming an insulation layer around the conductor.

6. The method of claim 5 wherein the conductor is formed by a plurality of wires stranded together.

7. The method of claim 6 wherein said material has a 100 gram needle penetration value greater than 100 tenths of a millimeter at 25° C.

8. The method of claim 5 wherein said material flows into voids, punctures, or cracks in the insulation formed prior to the installation of the cable.

9. The method of claim 5 wherein said material flows into space between the conductor and the insulation formed prior to the installation of the cable.

10. The method of claim 5 wherein said material flows into space between the conductor and the insulation formed during the installation of the cable.

11. The method of claim 5 wherein said material flows into voids, punctures, or cracks in the insulation formed during the installation of the cable.

12. The method of claim 5 wherein said material flows into voids, punctures, or cracks in the insulation formed after the cable is placed in service.

13. The method of claim 5 wherein said material flows into space between the conductor and the insulation formed after the cable is placed in service.

14. The method of claim 5 including applying a water barrier material over the conductor before applying the self-sealing material in step (b).

15. The method of claim 14 wherein the water barrier is a polymer sheet.

16. A method for imparting to a cable comprising a conductor, at least one insulating layer, and a material having a capacity of self-repairing the at least one insulating layer, the method comprising providing the cable with an inner layer comprising said material having the capacity, upon creation of a discontinuity in the at least one insulating layer, of reestablishing a continuity in the at least one insulating layer in a reversible manner, and wherein the material is polysiobutene.

17. The method according to claim 16 wherein the material is capable of at least partially filing the discontinuity without leaking from the cable in an uncontrolled manner.

18. A method of manufacturing a cable having a layer of self-repairing material, which has a capacity, upon creation of a discontinuity in an insulating layer, of reestablishing continuity in the insulating layer in a reversible manner, comprising the steps of:
  (a) depositing the self-repairing material, maintained in a fluid state, on a cable core; wherein the self-repairing material is polyisobutene, and
  (b) forming the layer of self-repairing material so as to obtain a uniform layer of a predetermined thickness.

* * * * *